United States Patent
Sugino et al.

(10) Patent No.: US 6,855,751 B2
(45) Date of Patent: Feb. 15, 2005

(54) SILICA POWDER AND METHOD FOR PRODUCING THE SAME

(75) Inventors: Maki Sugino, Ohmiya (JP); Hiroki Hirata, Ohmiya (JP); Katsumi Ogi, Ohmiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 59 days.

(21) Appl. No.: 10/409,105

(22) Filed: Apr. 9, 2003

(65) Prior Publication Data

US 2003/0216491 A1 Nov. 20, 2003

Related U.S. Application Data

(62) Division of application No. 09/790,674, filed on Feb. 23, 2001, now Pat. No. 6,569,922.

(30) Foreign Application Priority Data

Feb. 24, 2000 (JP) .......................................... 2000-047347
Sep. 29, 2000 (JP) .......................................... 2000-298207

(51) Int. Cl.$^7$ ..................... C08L 63/02; B32B 13/00; C08K 9/04
(52) U.S. Cl. ..................... 523/443; 523/216; 523/440; 428/403; 430/18; 430/31
(58) Field of Search ................................ 523/443, 216, 523/440; 428/403, 404; 430/18, 31

(56) References Cited

U.S. PATENT DOCUMENTS

| | | | |
|---|---|---|---|
| 3,383,347 | A | 5/1968 | Pettit |
| 3,407,165 | A | 10/1968 | Oepkes et al. |
| 4,245,005 | A | 1/1981 | Regnier et al. |
| 4,532,273 | A | 7/1985 | Kadowaki et al. |
| 4,826,895 | A | 5/1989 | Kanai et al. |
| 5,837,785 | A | 11/1998 | Kinsho et al. |
| 6,265,126 | B1 | 7/2001 | Nishihara et al. |
| 6,569,922 | B2 * | 5/2003 | Sugino et al. .............. 523/443 |

FOREIGN PATENT DOCUMENTS

| | | |
|---|---|---|
| EP | 0 174 390 | 3/1986 |
| EP | 0 870 790 | 10/1998 |
| GB | 1071167 | 6/1967 |
| JP | 62052561 | 3/1987 |
| WO | WO97/12835 | * 4/1997 |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

A silica powder surface-treated with and epoxy compound having a plurality of epoxy groups, in which at least one epoxy group of the epoxy compound is ring-opened to bind to the surface of the silica powder and at least a portion of the remaining epoxy groups of the epoxy compound are bonded to amine compounds. The silica powder may be produced by the surface treatment of a silica powder with an epoxy compound and an amine compound successively or with both these compound simultaneously.

17 Claims, 2 Drawing Sheets

SILICA POWDER AND METHOD FOR PRODUCING THE SAME

This Appl. is a DIV of Ser. No. 09/790,674 Feb. 23, 2001 Now U.S. Pat. No. 6,569,922

BACKGROUND OF THE INVENTION

1. Field of the Invention

The present invention relates to a silica powder which can be added to a recording material used for an ink jet printer. The present invention also relates to a method for producing the silica powder.

2. Background of the Invention

In recent years, ink jet printers have been widely used in homes and offices because they offer such advantages as low prices, quietness, low running costs, high printing quality and so on. Factors responsible for the widespread use of ink jet printers are that full-color and very fine images can be formed due to the astonishing advance of these printers, that the prices of ink jet printers are lower compared with color laser printers, and so on. Looking to the future, it appears that the demand for ink jet printers will increase more and more as computer penetration increases.

In an ink jet printer, an ink dye in an ink tank is ejected from a nozzle as droplets in accordance with an electrical signal from an computer to record a typeface or image on a recording material. A recording material for an ink jet printer can be formed by coating a transparent ink receiving layer on a base sheet. The base sheet includes a synthetic paper, a polyethylene terephthalate film, and so on. The ink-receiving layer comprises a binder, an inorganic oxide, water and so on as base materials, and can be formed by mixing these components in a slurry. The material for the binder is polyvinyl alcohol, and the inorganic oxide includes silica, alumina and so on. Upon contacting with the ink-receiving layer, the ink dye is absorbed by the binder and the inorganic oxide serves to inhibit the bleeding of the ink.

The properties required for the recording material for an ink jet printer are rapid absorption of the ink, no bleeding of the ink, brightness and sharpness of the resulting image, and so on.

Recently, demand for high definition of images has been increasing. In particular, in the case of printing of photographs, current recording materials for ink jet printers have problems such as bleeding of ink and unsatisfactory gradation in color.

Accordingly, there remains a need for recording materials for ink jet printers which overcome these disadvantages.

SUMMARY OF THE INVENTION

It is an object of the present invention is to provide a silica powder having a strong ability to adsorb an ink dye.

It is another object of the present invention to provide a method for producing such a silica powder.

The present invention provides a silica powder surface-treated with an epoxy compound having a plurality of epoxy groups. At least one of the epoxy groups of the epoxy compound is ring-opened and bound to the surface of the silica powder and at least a portion of the remaining epoxy groups of the epoxy compound are reacted with and bound to an amine compound. By using the silica powder thus produced as an additive for an recording material of an ink jet printer, the property of adsorbing an ink is increased and the smearing or bleeding of the ink can be prevented.

Without being limited to any particular theory, the inventive silica has amino groups on the surface thereof. When the silica powder is used as a base material of a recording material for an ink jet printer, the amino group on the surface of the silica powder, which has an electrically positive charge, can capture an ink dye, which has an electrically negative charge, on the surface of the silica powder. The ink dye component is not dispersed in a binder, and a bright and clear color can be formed. Accordingly, the surface-treated silica powder of the present invention strongly adsorbs an ink dye.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, where.

Figure 1A:
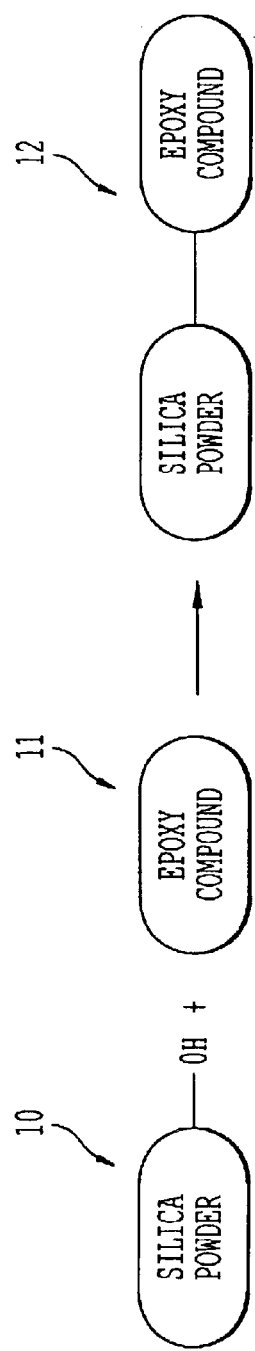
FIG. 1 illustrates the steps for producing a silica powder having an amino group on its surface according the present invention, where the numerals 10–14 represent the following.

10: silica powder
11: epoxy compound
12: primary product
13: amine compound
14: secondary product.

FIG. 2 shows chemical formulae of epoxy compounds which may be used to produce the silica powder of the present invention.

DETAILED DESCRIPTION OF THE PREFERRED EMBODIMENTS

As discussed above, at least a portion of the remaining epoxy groups of the epoxy compound are reacted and bound to the amine compound. In a preferred embodiment, all of the remaining epoxy groups of the epoxy compound are reacted and bound to the amine compound.

In another preferred embodiment, the epoxy compound has a molecular weight ranging from 200 to 1000, preferably from 200 to 700. This range includes all specific values and subranges therebetween, including 250, 300, 500, and 750. Since an epoxy compound having a molecular weight greater than 1000 is highly viscous, dilution of the epoxy compound with a large amount of a solvent is needed, and hence it becomes also impossible to provide many epoxy groups on the surface of the silica powder.

In a preferred embodiment, the epoxy compound contains no metal. If the epoxy compound contains any metal, then the percent surface occupation of the metal on the surface of the silica powder is high, and therefore it becomes impossible to provide many epoxy groups on the surface of the silica powder.

In another embodiment, the epoxy compound contains no metal and has a a molecular weight ranging from 200 to 1000.

In another preferred embodiment, the silica powder has a primary mean particle size ranging from 5 to 50 nm, preferably from 5 to 7 nm. These ranges include all specific values and subranges therebetween, such as 10, 15, 20, 25, 30, 35, 40, and 45 nm. If the primary mean particle size is larger than 50 nm, when used as the base material of an recording material for an ink jet printer, the ability to adsorb an ink is decreased, which may cause a problem of smearing due to bleeding of the ink.

In another preferred embodiment, the amine is aliphatic and contains at least one nitrogen atom.

In another preferred embodiment of the invention, the amine compound contains at least two nitrogen atoms in a molecule. The silica powder prepared using such an amine compound has many non-covalent electron pairs on its surface and, therefore, has improved ability to adsorb an ink.

In another embodiment of the invention, the silica powder has a specific surface area ranging from 50 to 380 $m^2/g$, preferably from 300 to 380 $m^2/g$. This range includes all specific values and subranges therebetween, such as 100, 150, 200, 250, and 350 $m^2/g$. If a silica powder having a specific surface area smaller than 50 $m^2/g$ is used as the base material of the recording material, the amount of an ink adsorbed by the silica powder is decreased. This may cause smearing due to bleeding of the ink, which leads to unclearness of the resulting image. If the specific surface area exceeds 380 $m^2/g$, the dispersibility of the silica powder may be poor.

In another preferred embodiment of the invention, the silica powder has an amine group equivalent ranging from $6.0 \times 10^{-6}$ to $1.2 \times 10^{-2}$ mol/g, preferably from $4.0 \times 10^{-4}$ to $1.2 \times 10^{-1}$ mol/g. This range includes all specific values and subranges therebetween, such as $1.0 \times 10^{-5}$, $1.0 \times 10^{-4}$, $1.0 \times 10^{-3}$, and $1.0 \times 10^{-2}$. If a silica powder having an amino group equivalent lower than $6.0 \times 10^{-6}$ mol/g is used as a base material of the recording material, the amount of an ink adsorbed by the silica powder is decreased. This may cause smearing due to bleeding of the ink which leads to unclearness of the resulting image. If the amino group equivalent exceeds $1.2 \times 10^{-2}$ mol/g, the dispersibility of the silica powder may be poor.

The present invention also provides a method for producing a silica powder, comprising surface-treating a silica powder with an epoxy compound and an amine compound.

In a preferred embodiment, the method provides a silica powder having a good ink-adsorptive ability.

Figure 1B:
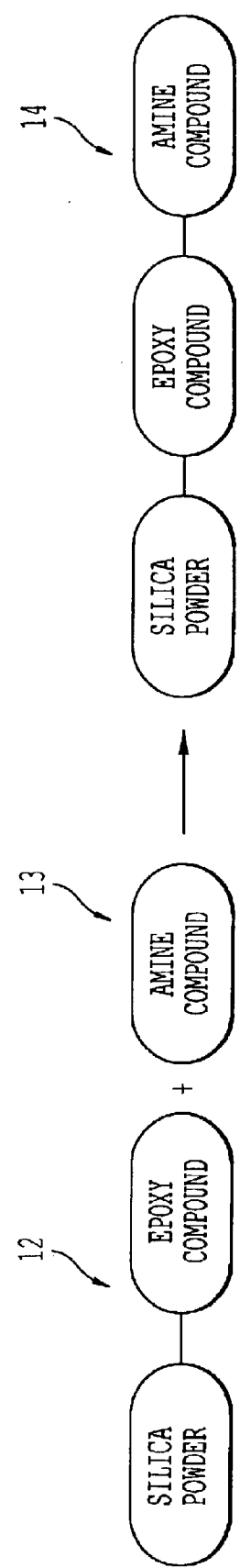
Figure 2A:
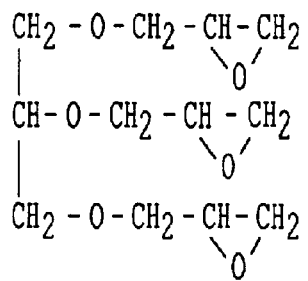
Figure 2B:
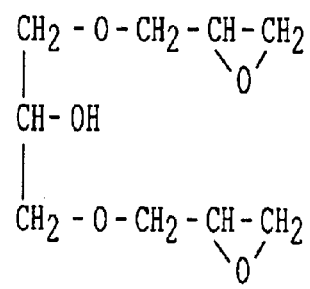
Figure 2C:
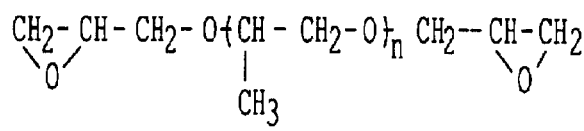
Figure 2D:
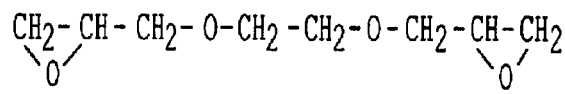
Figure 2E:
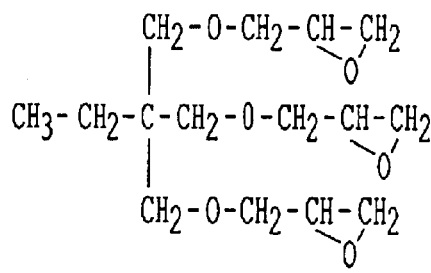
Figure 2F:
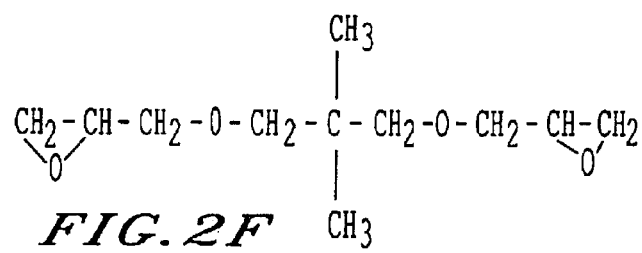
Figure 2G:
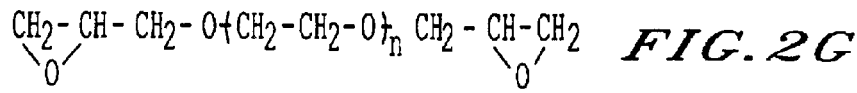

In another preferred embodiment of the invention, the method for producing a silica powder comprises the following steps, as shown in FIGS. 1(a) and 1(b): adding dropwise or spraying a liquid solution containing the epoxy compound (11) having a plurality of epoxy groups to or onto the silica powder (10) which is kept in a fluidized state; heating the silica powder (10), which has been added dropwise or sprayed with the epoxy compound (11), in a fluidized state to a temperature from 90 to 200° C. to produce a primary product (12); adding dropwise or spraying a liquid solution containing the amine compound (13) to or onto the primary product (12) which is kept in a fluidized state; and heating the primary product (12), which has been added dropwise or sprayed with the amino compound (13), in a fluidized state to a temperature from 90 to 200° C.

In another preferred embodiment of the invention, the epoxy compound can be ring-opened by reacting with hydroxyl group(s) present on the surface of the silica powder to bind to the surface of the silica powder, due to the high reactivity of the epoxy compound. Then, the surface of the primary product having the epoxy groups thereon reacts with the amine compound. In this manner, a silica powder having amino group(s) thereon can be produced. The temperature required for the surface treatment is 90 to 200° C. This temperature range includes all specific values and subranges therebetween, such as 110, 120, 150, 170, 180, and 190° C. If the temperature is lower than 90° C., the reaction of the epoxy compound with the surface of the silica powder cannot proceed sufficiently. In addition, in this case, when the first and second solvents are used, the solvents may not be evaporated completely and remain on the surface of the silica powder, inhibiting the properties of the resulting silica powder. If the temperature is higher than 200° C., the epoxy compound and the amine compound may be thermally decomposed.

In another preferred embodiment, the liquid solution containing the epoxy compound is prepared by dissolving the epoxy compound in a first solvent and the liquid solution containing the amine compound is prepared by dissolving the amine compound in a second solvent.

In another preferred embodiment of the invention, the epoxy compound and the amine compound are dissolved in the first and second solvent, respectively, to form liquid solutions. Each of the liquids is added dropwise to or sprayed onto the silica powder so that both the compounds can be deposited on the surface of the silica powder uniformly.

In another preferred embodiment, each of the first and second solvents is independently acetone, hexane, toluene, chloroform, diisopropyl ether or tetrahydrofuran mixtures may be used.

In another preferred embodiment of the invention, the first solvent is preferably acetone, which has no reactivity with the epoxy compound, is less toxic and inexpensive. The second solvent is preferably tetrahydrofuran (hereinafter, simply referred to as "THF") that is less toxic and inexpensive, or acetone.

In another preferred embodiment, the method for producing a silica powder comprises the following steps: adding dropwise or spraying both a liquid solution containing the epoxy compound having a plurality of epoxy groups and a liquid solution containing amine compound to or onto a silica powder which is kept in a fluidized state simultaneously; and beating the silica powder, which has been added dropwise or sprayed with the epoxy compound and the amine compound, in a fluidized state to a temperature from 90 to 200° C.

In another preferred embodiment of the invention, the surface of the silica powder is treated with both the epoxy compound and the amine compound simultaneously. In this embodiment, the epoxy group which is more reactive as compared to the amine compound can preferentially bind to the surface of the silica powder.

In another preferred embodiment, the invention provides the method for producing a silica powder, wherein the surface treatment of the silica powder is performed with the epoxy compound in an amount of 0.1 to 60 parts by weight and the amine compound in an amount of 0.1 to 50 parts by weight, both based on 100 parts by weight of the silica powder. This range for the amount of the epoxy compound includes all specific values as subranges therebetween, such as 0.2, 0.5, 1, 2, 5, 10, 25, and 50 parts by weight. This range for the amound of the amine compound includes all specific values as subranges therebetween, such as 0.2, 0.5, 1, 2, 5, 10, 25, and 40 parts by weight.

In another preferred embodiment, the blending ratio of the epoxy compound is 0.1 to 60 parts by weight, preferably 20 to 60 parts by weight, based on 100 parts by weight of the silica powder. If the blending ratio is smaller than 0.1 part by weight unreacted hydroxyl groups may remain on the surface of the silica powder. If the blending ratio is higher than 60 parts by weight, the silica powder may cause coagulation. The blending ratio of the amine compound is 0.1 to 50 parts by weight, preferably 5 to 50 parts by weight, based on 100 parts by weight of the silica powder. If the blending ratio is smaller than 0.1 part by weight, sufficient number of amino groups may not be provided on the surface of the silica powder. if the blending ratio is larger than 50 parts by weight, the silica powder may cause coagulation.

In another preferred embodiment, the invention provides for producing a silica powder, where the epoxy compound has at least two epoxy groups, contains no metal, and has a molecular weight ranging from 200 to 1000, the epoxy group has only one epoxy group, the epoxy group may be ring-opened upon the binding to the surface of the silica powder, and, therefore, the amine compound cannot be modified onto the surface of the silica powder.

In another preferred embodiment of the invention, the surface treatment of the silica powder or the primary product is carried out in an inert gas atmosphere. If performed in an atmosphere which is not an inert gas atmosphere, the epoxy group may be ring-opened due to its high reactivity.

The silica powder surface-treated according to the present invention can be produced by a wet or dry method. Exemplary epoxy compound to be used in the production method of the present invention includes glycidyl ethers each having at least two epoxy groups, such as glycerol triglycidyl ether [FIG. 2(a)], glycerol diglycidyl ether [FIG. 2(b)], diglycerol polyglycidyl ether, polypropylene glycol diglycidyl ether [FIG. 2(c)], ethylene glycol diglycidyl ether [FIG. 2(d)], trimethylolpropane polyglycidyl ether [FIG. 2(e)], neopentyl glycol diglycidyl ether [FIG. 2(f)] and polyethylene glycol diglycidyl ether [FIG. 2(g)]. Exemplary amine compound includes diethylamine [$(C_2H_5)_2NH$], diethanolamine [$(C_2H_4OH)_2NH$]), N-methylethanolamine ($CH_2NHCH_2CH_2OH$), ethylenediamine ($H_2NCH_2CH_2NH_2$), diethylenetriamine [($H_2NCH_2CH_2)_2NH$] and tetraethylenepentamine.

The production method of the present invention will be described below with reference to FIG. 1.

As shown in FIG. 1(a), a silica powder 10 having a primary mean particle size of 5 to 50 nm is surface-treated with an epoxy compound 11.

When the silica powder is produced by a dry method, the surface treatment with the epoxy compound is preferably also performed by a dry method so that the advantageous properties of the silica powder produced by a dry method, particularly no coagulating property and good dispersing property, are not be impaired. In addition to this advantage, the surface treatment by a dry method also has another advantages such that small amounts of the epoxy compound and the amine compound are needed for the surface treatment, that the amounts of these compounds adhered onto the silica powder can be controlled readily, and that separation of the silica powder after the surface treatment, which is needed in a wet method can be eliminated.

The surface treatment of the silica powder with the epoxy compound may also be performed by a wet method, in which the silica powder is dispersed in a solution of the epoxy compound dissolved in an appropriate solvent.

Herein below, the method for surface treatment of the silica powder with the epoxy compound by a dry method is described. First, the silica powder 10 is maintained in a fluidized state in a vessel using, for example, a high speed mixer. When the epoxy compound 11 is a liquid having a low viscosity, the liquid epoxy compound is then added dropwise to or sprayed onto the silica powder that is maintained in a fluidized state. When the epoxy compound is a solid or a liquid having a high viscosity, the epoxy compound is diluted with a first solvent and the resulting dilution is added dropwise to or sprayed onto the silica powder that is maintained in a fluidized state. In this manner, the epoxy compound can be adhered onto the surface of the silica powder uniformly. Next, the resulting silica powder is heated to 90 to 200° C. to fully proceed the reaction, whereby a primary product 12 can be produced. Even when the epoxy compound is a liquid having a low viscosity, it may be preferable to prepare a dilution of the epoxy compound by dissolving it in the first solvent and then add dropwise to or spray onto the silica powder. in this manner, the epoxy compound can be adhered onto the surface of the silica powder uniformly. The first solvent is not particularly limited so long as it can dissolve the epoxy compound used. Specifically, the first solvent may be acetone, hexane, toluene, chloroform, diisopropyl ether, THF or the like.

By the surface treatment, at least one of a plurality of epoxy groups of the epoxy compound can react with the hydroxyl group present on the surface of the silica powder to be ring-opened, and the remaining epoxy groups are left to be unreacted. Thus, the epoxy compound can chemically binds to the silica powder by the ring-opening reaction of the epoxy groups in such a state that at least one unreacted epoxy group remains, thereby providing the epoxy groups on the surface of the silica powder effectively. That is, the silica powder can be coated with an organic material containing epoxy groups chemically bound to the surface of the silica powder, and therefore it becomes possible to provide many epoxy groups on the surface of the silica powder. The epoxy compound to be used for the surface treatment may be an organic compound having at least two epoxy groups. The binding sites of the epoxy groups in the epoxy compound molecule are not particularly limited. However, a compound is preferable in which two epoxy groups are present at the both ends of the epoxy compound molecule.

As shown in FIG. 1(b), the primary product 12 is further surface-treated with the amine compound 13. By this surface treatment, the unreacted epoxy groups remaining on the surface of the silica powder can react with the amine compound to give a silica powder having amino groups on its surface. That is, the epoxy groups remaining on the surface of the primary product can cause ring-opening reaction with the amine compound, whereby a secondary product 14 which has amino groups on its surface can be produced.

When the silica powder is produced by a dry method, the surface treatment with the amine compound is preferably performed by a dry method so that the advantageous properties of the silica powder produced by a dry method, such as no coagulating properties and good dispersing property, are not be impaired, as in the case of the surface treatment of the silica powder with the epoxy compound mentioned above.

The surface treatment of the primary product with the amine compound may be performed in a wet method.

Herein below, the method for surface treatment of the primary product with the amine compound by a dry method is described. First, the primary product 12 is maintained in a fluidized state in a vessel using, for example, a high speed mixer. when the amine compound 13 is a liquid having a low viscosity, the liquid amine compound is then added dropwise to or sprayed onto the primary product that is maintained in a fluidized state. When the amine compound is a solid or a liquid having a high viscosity, the amine compound is diluted with a second solvent and the resulting dilution is added dropwise to or sprayed onto the primary product that is maintained in a fluidized state. In this manner, the amine compound can be adhered onto the surface of the primary product uniformly. Next, the resulting primary product is heated to 90 to 200° C. to fully proceed the reaction, whereby a secondary product 14 can be produced on which the amine compound is fixed. Even when the amine compound is a liquid having a low viscosity, it may be preferable to prepare a dilution of the amine compound 13 by dissolving it in the second solvent and then add it dropwise to or spray it onto the primary product. in this manner, the amine compound can be adhered onto the surface of the primary product uniformly. The second solvent is not particularly limited so long as it can dissolve the amine compound used and has no reactivity with the epoxy compound. Exemplary second solvent includes acetone, hexane, toluene, chloroform, diisopropyl ether and THF.

The silica powder is heated for the purpose of proceeding the reaction of the hydroxyl group present on the surface of the silica powder with at least one epoxy group of the epoxy compound and the reaction of the remaining epoxy groups with the amino compound, respectively. This heat treatment is preferably carried out in an inert gas atmosphere so that the oxidation of the epoxy compound can be prevented. The inert gas includes nitrogen, argon and helium. The time period required for the heat treatment may vary depending on the temperature of the heat treatment and the types of the epoxy compound and amine compound used, but preferably from 1 to 6 hours, more preferably from 1 to 3 hours. Too short heat treatment may cause disadvantages such that the reaction of the epoxy compound with the surface of the silica powder cannot proceed sufficiently and that the solvent cannot be fully evaporated and, consequently, the advantageous properties of the silica powder are likely to be impaired, as in the case where the temperature of the heat treatment is too low.

When the silica powder prepared by the method described above is used as the base material for forming an ink receptive layer of a recording material for an ink jet printer, protonization of the non-covalent electron pair of the amino group occurs, whereby the surface of the silica powder is rendered electrically positive. On the other hand, the chromophore (which develops a color) of an anionic compound which forms an ink dye component (i.e., primary colors of cyan, magenta and yellow, and black) has an electrically negatively charged ion with an electrically negative ion, and attracted by the positive ion of the amino group and captured on the surface of the silica powder. As a result, the dispersion of the ink dye component a binder can be prevented, leading to the formation of a bright and clear color.

The amount of the amino groups provided on the surface of the silica powder produced according to the present invention is determined in terms of an amino group equivalent. As used herein, the term "amino group equivalent" refers to the number of moles of the amino groups adhered onto 1 g of the silica powder. The determination of the amino group equivalent is performed as follows. First, 40 ml of a mixed solution comprising chloroform: acetic acid=1:2 and 0.1 mol/l of a perchloric acid-acetic acid solution are provided. Next, 1 g of a silica powder which had been surface-treated is charged in a beaker together with 40 ml of the chloroform-acetic acid mixed solution and a stirring bar, and the resultant is then titrated with the perchloric acid-acetic acid solution using a potentiometric titration apparatus while stirring with a stirrer. The inflection point of the resulting titration curve is defied as the end point, and the amino group equivalent is determined according to the following equation (1) based on the titration amount (ml):

$$\text{Amino group equivalent} = [(\text{concentration of perchloric acid}) \times (\text{factor of perchloric acid}) \times (\text{titration amount})]/100 \quad (1)$$

The present invention also relates to a method of ink printing. In this method, an ink is contacted with a substrate comprising the surface-modified silica of the present above. As discussed above, without being limited to any particular theory, the ink is absorbed to the substrate by binding to the inventive silica. Suitable substrates are well-known to those in the ink printing art.

EXAMPLES

The examples and comparative examples of the present invention will be described herein below. Having generally described this invention, a further understanding can be obtained by reference to certain specific examples which are provided herein for purposes of illustration only and are not intended to be limiting unless otherwise specified.

Example 1

A silica powder having a specific surface area of 130 m$^2$/g ("Aerozyl #130", a product from Nihon Aerozyl) (100 g) was provided. Glycerol triglycidyl ether ("EX-314", a product from Nagase Chemicals Ltd.) (31 g) was provided as an epoxy compound and acetone was provided as a first solvent. The epoxy compound was dissolved in acetone to prepare an epoxy solution. Diethylamine (22 g) was provided as an amine compound and acetone was provided as a second solvent. The amine compound was dissolved in acetone to prepare an amine solution.

The silica powder was charged and stirred in a mixer so that the silica powder was maintained in a fluidized state. The epoxy solution was added to the silica powder maintained in a fluidized state to adhere the epoxy compound to the silica powder uniformly. The silica powder thus adhered with the epoxy compound was then heated at 180° C. in inert gas stream and left to stand for 1 hour, thereby producing a primary product. The primary product was added with the amine solution while maintaining in a fluidized state, so that the amine compound was adhered onto the primary product uniformly. The primary product thus adhered with the amine compound was heated at 180° C. in inert gas stream, and then left to stand for 2 hours, thereby producing a surface treated silica powder as a secondary product.

Example 2

The same silica powder and epoxy compound as those in Example 1 were provided and the reaction was performed under the same conditions as in Example 1, except that diethanolamine (8 g) was used as the amine compound, thereby producing a surface-treated Silica powder as a secondary product.

Example 3

The same silica powder and epoxy compound as those in Example 1 were provided and the reaction was performed under the same conditions as in Example 1, except that diethalolamine (23 g) and THF were provided as the amine compound and the second solvent, respectively, and the amine compound was dissolved in THF to prepare an amine dilution, thereby producing a surface-treated silica powder as a secondary product.

Example 4

The same silica powder and epoxy compound as those in Example 1 were provided and the reaction was performed under the same conditions as in Example 1, except that N-methylethanolamine (6 g) and THF were provided as the amine compound and the second solvent, respectively, the amine compound was dissolved in THF to prepare an amine solutionand the primary product was heated at 150° C., thereby producing a surface-treated silica powder as a second product.

Example 5

A silica powder having a specific surface area of 380 m$^2$/g ("Aerozyl #380S", a product from Nihon Aerozyl) (100 g) was provided. Glycerol triglycidyl ether ("EX-314", a product from Nagase Chemicals Ltd.) (45 g) was provided as an epoxy compound and acetone was provided as a first solvent. The epoxy compound was dissolved in acetone to prepare an epoxy dilution. Diethanolamine (24 g) was provided as an amine compound and acetone was provided as a second solvent—The amine compound was dissolved in acetone to prepare an amine dilution.

The silica powder was charged in a mixer and stirred so that the silica powder was maintained in a fluidized state. The epoxy solutionwas added to the silica powder maintained in a fluidized state to adhere the epoxy compound onto the silica powder uniformly. The silica powder thus adhered with the epoxy compound was then heated at 180° C. in inert gas stream and left to stand for 1 hour, thereby producing a primary product. The primary product was added with the amine solutionwhile maintaining in a fluidized state, so that the amine compound was adhered onto the primary product uniformly. The primary product thus adhered with the amine compound was heated at 180° C. in inert gas stream, and then left to stand for 2 hours, thereby producing a surface-treated silica powder as a secondary product.

Example 6

The same silica powder and epoxy compound as those in Example 5 were provided and the reaction was performed under the same conditions as in Example 5, except that diethylamine (22 g) and THF were provided as the amine compound and the second solvent, respectively, and the amine compound was dissolved in THF to prepare an amine dilution, thereby producing a surface-treated silica powder as a secondary product.

Example 7

The same silica powder and epoxy compound as those in Example 5 were provided and the reaction was performed under the same conditions as in Example 5, except that ethylenediamine (13 g) and toluene were provided as the amine compound and the second solvent, respectively, and the amine compound was dissolved in toluene to prepare an amine dilution, thereby producing a surface-treated silica powder as a secondary product.

Example 8

The same silica powder and epoxy compound as those in Example 7 were provided and the reaction was performed under the same conditions as in Example 7, except that ethylenediamine (5 g) was provided and the primary product was heated at 110° C., thereby producing a surface-treated silica powder as a secondary product.

Example 9

The same silica powder and epoxy compound as those in Example 7 were provided and the reaction was performed under the same conditions as in Example 7, except that ethylenediamine (16 g) was provided and the primary product was heated at 150° C., thereby producing a surface-treated silica powder as a secondary product.

Example 10

The same silica powder and epoxy compound as those in Example 7 were provided and the reaction was performed under the same conditions as in Example 7, except that ethylenediamine (16 g) was provided and the primary product was heated at 150° C. and then left to stand for 1 hour, thereby producing a surface-treated silica powder as a secondary product.

Example 11

The same silica powder, epoxy compound and amine compound as those in Example 9 were provided and the reaction was performed under the same conditions as in Example 9, except that the primary product was heated at 90° C., thereby producing a surface-treated silica powder as a secondary product.

Example 12

The same silica powder, epoxy compound and amine compound as those in Example 10 were provided and the reaction was performed under the same conditions as in Example 10, except that the primary product was heated at 90° C., thereby producing a surface-treated silica powder as a secondary product.

Example 13

The same silica powder and epoxy compound as those in Example 5 were provided and the reaction was performed under the same conditions as in Example 5, except that diethylenetriamine (16 g) was provided as the amine compound and the primary product was heated at 130° C., thereby producing a surface-treated silica powder as a secondary product.

Example 14

The same silica powder and epoxy compound as those in Example 5 were provided and the reaction was performed under the same conditions as in Example 5, except that tetraethylenepentamine (20 g) and THF were provided as the amine compound and the second solvent, respectively, the amine compound was dissolved in THF to prepare an amine solutionand the primary product was heated as 130° C., thereby producing a surface-treated silica powder as a secondary product.

Example 15

The same silica powder as that in Example 5 was provided and the reaction was performed under the same conditions as in Example 5, except that pentaerythritol polyglycidyl ether ("EX-411", a product from Nagase Chemicals Ltd.) (60 g) and ethylenediamine (13 g) were provided as the epoxy compound and the amine compound, respectively, and the primary product was heated as 110° C. and then left to stand for 1 hour, thereby producing a surface-treated silica powder as a secondary product.

Example 16

The same silica powder as that in Example 5 was provided and the reaction was performed under the same conditions as in Example 5, except that trimethylolpropane polyglycidyl ether ("SR-TMP", a product from Sakamoto Yakuhin Kogyo Co., Ltd.) (44 g) and ethylenediamine (13 g) were provided as the epoxy compound and the amine compound, respectively, and the primary product was heated as 110° C.

and then left to stand for 1 hour, thereby producing a surface-treated silica powder as a secondary product.

Example 17

The same silica powder as that in Example 5 was provided and the reaction was performed under the same conditions as in Example 5, except that polyglycerol polyglycidyl ether ("SR-4GL", a product from Sakamoto Yakuhin Kogyo Co., Ltd.) (45 g), ethylenediamine (13 g) and TFIF were provided as the epoxy compound, the amine compound and the secondary solvent, respectively, the amine compound was dissolved in THF to prepare an amine dilution, and the primary product was heated as 110° C. and then left to stand for 1 hour, thereby producing a surface-treated silica powder as a secondary product.

Example 18

The same silica powder as that in Example 5 (100 g) was provided. Glycerol triglycidyl ether ("EX-314", a product from Nagase Chemicals Ltd.) (45 g) was provided as an epoxy compound. Ethylenediamine (5 g) was provided as an amine compound. The epoxy compound was dissolved in acetone to prepare an epoxy dilution, and the amine compound was dissolved in the epoxy solutionto prepare a mixed solution.

The silica powder was charged in a mixer and stirred so that the silica powder was maintained in a fluidized state. The mixed solution was added to the silica powder maintained in a fluidized state to adhere the epoxy compound and the amine compound onto the silica powder uniformly. The silica powder thus prepared was then heated at 150° C. in inert gas stream and left to stand for 2 hour, thereby producing a surface-treated silica powder as a secondary product.

Example 19

The same silica powder, epoxy compound and amine compound as those in Example 18 were provided and the reaction was performed under the same conditions as in Example 18, except that silica powder is heated at 180° C., thereby producing a surface-treated silica powder as a secondary product.

Example 20

The same silica powder as that in Example 5 was provided and the reaction was performed under the same conditions as in Example 5, except that glycerol triglycidyl ether ("EX-314", a product by Nagase Chemicals Ltd.) (60 g) and N-methylethanolamine (0.2 g) were provided as the epoxy compound and the amine compound, respectively, and the primary product was heated at 160° C., thereby producing a surface-treated silica powder as a secondary product.

Example 21

The same silica powder as that in Example 5 was provided and the reaction was performed under the same conditions as in Example 5, except that glycerol triglycidyl ether ("EX-314", a product by Nagase Chemicals Ltd.) (0.1 g), ethylenediamine (45 g) and THP were provided as the epoxy compound, the amine compound and the secondary solvent, respectively the amine compound was dissolved in THP to prepare an amine dilution, and primary product was heated at 150° C., thereby producing a surface-treated silica powder as a secondary product.

Comparative Example 1

The same silica powder as that in Example 5 (100 g) was provided and evaluated for an ability to adsorb an anion without any surface treatment.

Comparative Example 2

The surface-treated silica powders obtained in Examples 1 to 21 as the secondary products and the silica powder of Comparative Example 1 were evaluated for an ability to adsorb an anion according to the following method.

A silica powder (2 g) to be tested was added with 10 mmol/g of an aqueous sodium 2-naphthalene sulfonate solution (100 ml) to prepare a mixed solution. The mixed solution was stirred for 5 min. to adsorb the anion species on the silica powder. The resulting mixed solution in which the anion species was adsorbed on the powder was filtered. A portion (1 ml) of the filtrate was transferred in a mess flask and then diluted with water (100 ml). The absorbance of the resulting dilution was determined using a UV spectrophotometer to evaluate the ability of the surface treated silica powder to adsorb the anion. Each of the surface-treated silica powders was also determined for its amino group equivalent by the method as described above. The results for the silica powders produced in Examples 1 to 12 are shown in Table 1 and the results for the silica powders produced in Examples 13 to 21 and Comparative Example 1 are shown in Table 2.

TABLE 1

| | Silica powder | | Epoxy compound | 1st solvent | | 2nd Solvent | Amino group equivalent [mol/g] | % Absorption of Anion dye (%) |
|---|---|---|---|---|---|---|---|---|
| | Specific surface area | Weight | Treatment conditions | | Amine Compound Treatment conditions | | | |
| Ex. 1 | 130 m²/g | #130 100 g | EX-314, Acetone | | Diethylamine 180° C., 2 hr, 22 g | Acetone | 1.57 × 10⁻³ | 7.11 |
| Ex. 2 | | | | | | | | |
| Ex. 3 | | | 180° C., 1 hr, 31 g | | Diethanolamine 180° C., 2 hr, 8 g | Acetone | 4.39 × 10⁻⁴ | 14.7 |
| Ex. 4 | | | | | Diethanolamine 180° C., 2 hr, 23 g | THF | 1.14 × 10⁻³ | 15.8 |
| | | | | | N-methyl-ethanolamine 150° C., 2 hr, 6 g | THF | 4.67 × 10⁻⁴ | 6.3 |
| Ex. 5 | 380 m²/g | #380S 100 g | EX-314, Acetone | | Diethanolamine 180° C., 2 hr, 24 g | Acetone | 1.08 × 10⁻³ | 27.2 |
| Ex. 6 | | | 180° C., 1 hr, 45 g | | Diethylamine 180° C., 2 hr, 22 g | THF | 1.44 × 10⁻³ | 14.5 |
| Ex. 7 | | | | | Ethylenediamine 180° C., 2 hr, 13 g | Toluene | 2.19 × 10⁻³ | 39.0 |
| Ex. 8 | | | | | Ethylenediamine | Toluene | 8.87 × 10⁻⁴ | 15.8 |

TABLE 1-continued

| | Silica powder | | Epoxy compound Treatment conditions | 1st solvent | Amine Compound Treatment conditions | 2nd Solvent | Amino group equivalent [mol/g] | % Absorption of Anion dye (%) |
|---|---|---|---|---|---|---|---|---|
| | Specific surface area | Weight | | | | | | |
| Ex. 9 | | | | | Ethylenediamine 110° C., 2 hr, 5 g | Toluene | $3.30 \times 10^{-3}$ | 64.9 |
| Ex. 10 | | | | | Ethylenediamine 150° C., 2 hr, 16 g | Toluene | $2.96 \times 10^{-3}$ | 68.2 |
| Ex. 11 | | | | | Ethylenediamine 150° C., 1 hr, 16 g | Toluene | $2.64 \times 10^{-3}$ | 19.2 |
| Ex. 12 | | | | | Ethylenediamine 90° C., 2 hr, 16 g | Toluene | $2.48 \times 10^{-3}$ | 8.66 |
| | | | | | 90° C., 1 hr, 16 g | | | |

TABLE 2

| | Silica powder | | Epoxy compound Treatment conditions | 1st solvent | Amine compound Treatment conditions | 2nd solvent | Amino group equivalent [mol/g] | % of Absorption of Anoion dye (%) |
|---|---|---|---|---|---|---|---|---|
| | Specific surface area | Weight | | | | | | |
| Ex. 13 | 380 m²/g #380S | 100 g | EX-314 180° C., 1 hr, 45 g | Acetone | Diethylamine-triamine 130° C., 2 hr, 16 g | Acetone | $4.20 \times 10^{-3}$ | 66.2 |
| Ex. 14 | | | EX-314 180° C., 1 hr, 45 g | Acetone | Tetraethylene-pentamine 130° C., 2 hr, 20 g | THF | $2.56 \times 10^{-3}$ | 54.0 |
| Ex. 15 | | | EX-411 180° C., 1 hr, 60 g | Acetone | Ethylenediamine 110° C., 1 hr, 13 g | Acetone | $2.00 \times 10^{-3}$ | 21.8 |
| Ex. 16 | | | SR-TMP 180° C., 1 hr, 44 g | Acetone | Ethylenediamine 110° C., 1 hr, 13 g | Acetone | $2.20 \times 10^{-3}$ | 18.3 |
| Ex. 17 | | | SR-4GL 180° C., 1 hr, 45 g | Acetone | Ethylenediamine 110° C., 1 hr, 13 g | THF | $2.20 \times 10^{-3}$ | 24.0 |
| Ex. 18 | | | EX-314 150° C., 2 hr, 45 g | Acetone | Ethylenediamine 150° C., 2 hr, 5 g | Acetone | $8.06 \times 10^{-4}$ | 41.9 |
| Ex. 19 | | | EX-314 180° C., 2 hr, 45 g | Acetone | Ethylenediamine 180° C., 2 hr, 5 g | Acetone | $8.88 \times 10^{-4}$ | 50.7 |
| Ex. 20 | | | EX-314 180° C., 1 hr, 60 g | Acetone | N-methyl-ethanolamine 160° C., 2 hr, 0.2 g | Acetone | $1.33 \times 10^{-5}$ | 4.21 |
| Ex. 21 | | | EX-314 180° C., 1 hr, 0.1 g | Acetone | Ethylenediamine 150° C., 2 hr, 45 g | THF | $1.03 \times 10^{-2}$ | 3.89 |
| Com. Ex. 1 | 380 m²/g #380S | 100 g | — | | — | | | 3.4 |

As shown in Tables 1 and 2, it was found that the silica powders of Examples 1 to 21 showed higher ability to adsorb an anion compared with the silica powder of Comparative Example 1 in which no surface treatment was performed.

Obviously, numerous modifications and variations of the present invention are possible in light of the above teachings. It is therefore to be understood that within the scope of the appended claims, the invention may be practiced otherwise than as specifically described herein.

This application is based on Japanese Patent Application Serial No. 2000-047347, filed on Feb. 24, 2000, and Japanese Patent Application Serial No. 2000-298207, filed on Sep. 29, 2000, both of which are incorporated herein by reference their entirety.

What is claimed is:

1. A method for producing a surface-treated silica powder comprising:
   adding dropwise or spraying a liquid solution containing an epoxy compound having a plurality of epoxy groups to or onto the silica powder, wherein the silica powder is kept in a fluidized state;
   heating the silica powder to a temperature from 90 to 200° C. to produce primary product;
   adding dropwise or spraying a liquid solution containing an amine compound to or onto the primary product, wherein the primary product is kept in a fluidized state; and
   heating the primary product to a temperature from 90 to 200° C.,
   wherein the liquid solution containing the epoxy compound is prepared by dissolving the epoxy compound in a first solvent and the liquid solution containing the amine compounds is prepared by dissolving the amine compound in a second solvent.

2. The method according to claim 1, wherein the first solvent and the second solvent are independently at least one selected from the group consisting of acetone, hexane, toluene, chloroform, diisopropyl ether and tetrahydrofuran.

3. A method for producing a surface-treated silica powder, comprising:
   adding dropwise or spraying both a liquid solution containing an epoxy compound having a plurality of epoxy groups and a liquid solution containing an amine compound to or onto a silica powder which is kept in a fluidized state simultaneously; and
   heating the silica powder, which has been added dropwise or sprayed with both the epoxy compound and the amine compound, in a fluidized state to a temperature from 90 to 200° C., wherein the liquid solution containing the epoxy compound is prepared by dissolving the epoxy compound in a first solvent and the liquid solution containing the amine compound is prepared by dissolving the amine compound in a second solvent.

4. The method according to claim 3, wherein the first solvent and the second solvent are independently at least one selected from the group consisting of of acetone, hexane, toluene, chloroform, diisopropyl ether and tetrahydrofuran.

5. The method according to claim 1, wherein the surface treatment of the silica powder is performed with the epoxy compound in an amount of 0.1 to 60 parts by weight and the amine compound in an amount of 0.1 to 50 parts by weight, both based on 100 parts by weight of the silica powder.

6. The method according to claim 3, wherein the surface treatment of the silica powder is performed with the epoxy compound in an amount of 0.1 to 60 parts by weight and the amine compound in an amount of 0.1 to 50 parts by weight, both based on 100 parts by weight of the silica powder.

7. The method according to claim 1, wherein the epoxy compound (1) has at least two epoxy groups, (2) contains no metal, and (3) has a molecular weight ranging from 200 to 1000.

8. The method according to claim 3, wherein the epoxy compound (1) has at least two epoxy groups, (2) contains no metal, and (3) has a molecular weight ranging from 200 to 1000.

9. The method according to claim 1, wherein the surface treatment of the silica powder or the primary product is carried out in an inert gas atmosphere.

10. The method according to claim 3, wherein the surface treatment of the silica powder is carried out in an inert gas atmosphere.

11. The method according to claim 1, wherein the surface treatment of the silica powder and the primary product is carried out in an inert gas atmosphere.

12. The method according to claim 1, wherein the epoxy compound is at least one selected from the group consisting of glycerol diglycidyl ether, glycerol diglycidyl ether, diglycerol polyglycidyl ether, polypropylene glycol diglycidyl ether, ethylene glycol diglycidyl ether, trimethylolpropane polyglycidyl ether, neopentyl glycol diglycidyl ether, and polyethylene glycol diglycidyl ether.

13. The method according to claim 3, wherein the epoxy compound is at least one selected from the group consisting of glycerol triglycidyl ether, glycerol diglycidyl ether, diglycerol polyglycidyl ether, polypropylene glycol diglycidyl ether, ethylene glycol diglycidyl ether, trimethylolpropane polyglycidyl ether, neopentyl glycol diglycidyl ether, and polyethylene glycol diglycidyl ether.

14. The method according to claim 3, wherein the amine compound is at least one selected from the group consisting of diethylamine, diethanolamine, N-methylethanolamime, ethylenediamine, diethylenetriamine, and tetraethylenepentamine; and the epoxy compound is selected from the group consisting of glycerol triglycidyl ether, glycerol diglycidyl ether, diglycerol polyglycidyl ether, polypropylene glycol diglycidyl ether, ethylene glycol diglycidyl ether, trimethylolpropane polyglycidyl ether, neopentyl glycol diglycidyl ether, and polyethylene glycol diglycidyl ether.

15. The method according to claim 3, wherein the amine compound is at least one selected from the group consisting of diethylamine, diethanolamine, N-methylethanolamine, ethylenediamine, diethylenetriamine, and tetraethylenepentamine; and the epoxy compound is selected from the group consisting of glycerol diglycidyl ether, glycerol diglycidyl ether, diglycerol polyglycidyl ether, polypropylene glycol diglycidyl ether, ethylene glycol diglycidyl ether, trimethylolpropane polyglycidyl ether, neopentyl glycol diglycidyl ether, and polyethylene glycol diglycidyl ether.

16. A method of ink printing, comprising contacting an ink with a substrate comprising a surface-modified silica powder obtained by the method of claim 1, wherein the epoxy compound comprise at least one glycidyl ether.

17. A method of ink printing, comprising contacting an ink with a substrate comprising a surface-modified silica powder obtained by the method of claim 3, wherein the epoxy compound comprises at least one glycidyl ether.

* * * * *

UNITED STATES PATENT AND TRADEMARK OFFICE
CERTIFICATE OF CORRECTION

PATENT NO. : 6,855,751 B2  Page 1 of 1
APPLICATION NO. : 10/409105
DATED : February 15, 2005
INVENTOR(S) : Sugino et al.

It is certified that error appears in the above-identified patent and that said Letters Patent is hereby corrected as shown below:

On the title page, the Terminal Disclaimer information has been omitted. Item (45) and the Notice information should read as follows:

-- [45] **Date of Patent: *Feb. 15, 2005**

[*] Notice: Subject to any disclaimer, the term of this patent is extended or adjusted under 35 U.S.C. 154(b) by 59 days.

This Patent is subject to a terminal disclaimer. --

Signed and Sealed this

Twelfth Day of December, 2006

JON W. DUDAS
*Director of the United States Patent and Trademark Office*